United States Patent [19]

Wentworth

[11] Patent Number: 4,466,756
[45] Date of Patent: Aug. 21, 1984

[54] DRIVE COUPLER
[75] Inventor: Milo R. Wentworth, Deerfield, Ill.
[73] Assignee: Honeywell Inc., Minneapolis, Minn.
[21] Appl. No.: 513,140
[22] Filed: Jul. 12, 1983
[51] Int. Cl.$^3$ .............................................. F16B 2/02
[52] U.S. Cl. .................................... 403/311; 403/312
[58] Field of Search ...................... 403/311, 312, 310; 464/182, 100

[56] References Cited
U.S. PATENT DOCUMENTS

| | | | |
|---|---|---|---|
| 1,084,712 | 1/1914 | Schroeder | 403/312 |
| 1,508,158 | 9/1924 | Bower | 403/312 |
| 1,951,220 | 3/1934 | Tarr | 403/312 |
| 2,302,882 | 11/1942 | Ohlendorf | 403/311 X |
| 3,664,693 | 5/1972 | Irons | 403/310 X |

Primary Examiner—Andrew V. Kundrat
Attorney, Agent, or Firm—Mitchell J. Halista; Trevor B. Joike

[57] ABSTRACT

A drive coupler uses a first and a second U-shaped coupler half of similar configuration with each coupler half having cutouts in the ends of the legs of the "U" forming half of a pair of holes for accepting peripheral grooves adjacent to the ends of a pair of shafts to be connected by the coupler. The two halves of the coupler are retained in a mating orientation with the ends of the legs of the "U" in an abutting relationship to capture the grooves at the ends of the shafts in the holes formed therebetween by a transverse clamp bolt passing through the coupler. In one embodiment, the ends of the coupler formed by the mated halves of the coupler are provided with grooves to cooperate with ribs in a frame encompassing the coupler whereby the coupler grooves are arranged to slide on the ribs in the frame to prevent rotation of the coupler while permitting a translational or push-pull motion. In a second embodiment, the holes in the coupler for capturing the ends of the shafts to be coupled are non-circular, and the grooves in the ends of the shafts are correspondingly non-circular whereby the coupler can be used to transmit rotational as well as push-pull motion in a shaft coupler assembly wherein the drive coupler is free to rotate.

11 Claims, 6 Drawing Figures

DRIVE COUPLER

BACKGROUND OF THE INVENTION

Field of the Invention

The present invention relates to drive couplers. More specifically, the present invention is directed to a drive coupler for transmitting push-pull and rotational motion.

SUMMARY OF THE INVENTION

An object of the present invention is to provide an improved drive coupler.

In accomplishing this and other objects, there has been provided, in accordance with the present invention, a drive coupler having first and second similar coupler halves each having a U-shaped configuration and a clamp means for retaining said coupler halves in a mated combination having holes therethrough formed by abutting cutouts in the coupler halves for capturing grooved ends of shafts to be coupled.

BRIEF DESCRIPTION OF THE DRAWINGS

A better understanding of the present invention may be had when the following detailed description is read in connection with the accompanying drawings, in which.

DESCRIPTION OF PREFERRED EMBODIMENT

Detailed Description

Figure 1:
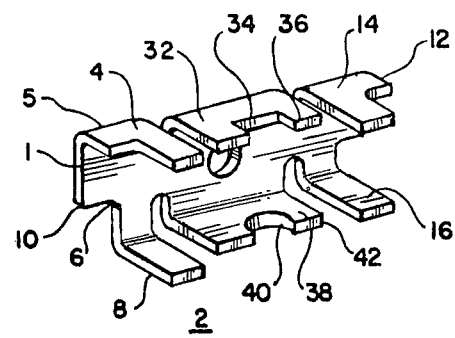
FIG. 1 is a pictorial illustration of a half of a drive coupler embodying an example of the present invention.
Figure 2:
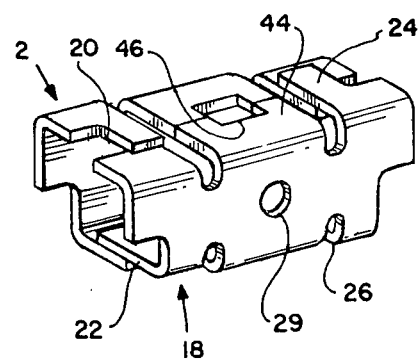
FIG. 2 is a pictorial illustration of two mated halves of a drive coupler utilizing the configuration shown in FIG. 1, FIG. 3, is a pictorial illustration of the mated halves shown in FIG. 2 with a clamp bolt passing therethrough.

Referring to FIG. 1 in more detail, there is shown a half of a drive coupler embodying an example of the present invention. This drive coupler uses two mating halves with each half having the configuration shown in FIG. 1 to form a mating assembly with overlapping end extensions as shown in FIG. 2. Specifically, a first end 1 of a coupler half 2 has a first extension 4 perpendicular to a first edge 5 of a longitudinal side or base 6 and extending therefrom in a plane transversely displaced from the longitudinal axis of the coupler half 2. A second perpendicular extension 8 is similarly located on a second edge 10 of the base 6 of the coupler half 2 on the other side of the longitudinal axis of the coupler half 2 from the first extension 4 to form a U-shaped configuration with the first extension 4.

Figure 3:
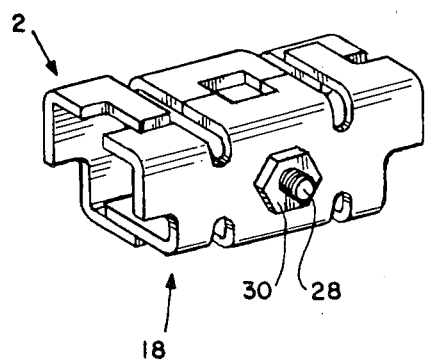

A second end 12 of the coupler half 2 has a third extension 14 perpendicular to the first edge 5 in a plane transversely displaced from the longitudinal axis of the coupler half 2 by a shorter distance than the displacement of the first extension 4, i.e., the third extension 14 is located beneath the first extension 4. Similarly, a fourth perpendicular extension 16 is located on the second edge 10 on the other side of the longitudinal axis of the coupler half 2 from the third extension 14 to form a U-shaped configuration with the third extension 14. The fourth extension 16 is transversely displaced from the longitudinal axis of the coupler half 2 by a shorter distance than the displacement of the second extension 8, i.e., the fourth extension is located beneath the second extension 8. Accordingly, the use of a similar second coupler half 18, as shown in FIG. 2, rotated 180° on a transverse axis from the first coupler half 1 and mated to the first coupler half 1 allows the first and second extensions 4, 8 of the first coupler half to overlie the pair of third and fourth extensions 20, 22 of the second coupler half 18. Concurrently, a pair of first and second extensions 24, 26 of the second coupler half 18 overlie the third and fourth extensions 14, 16 of the first coupler half 1. While the overlapping extensions 4, 8, 14, 16, as shown in FIG. 2, provides a measure of transverse motion restraint of the coupler halves 2, 18, a clamp bolt 28 such as shown in FIG. 3 passing through a center hole 29 in the coupler is arranged in combination with a nut 30 to securely fasten the two halves 2, 18 of the coupler together.

A fifth extension 32 on the coupler half 2 perpendicular to the edge 5 and located between the first and third extensions 4, 14 has a cutout 34 in an outer edge 36 thereof. A sixth extension 38 on the coupler half 2 perpendicular to the edge 10 and located between the second and fourth extensions 8, 16 has a cutout 40 in an outer edge 42 thereof. The second half 18 of the coupler would have a similar pair of seventh and eighth extensions with cutouts therein. For example, as shown in FIG. 2, a seventh extension 44 has a cutout 46. The mating of the coupler halves 2, 18 is effective to align the cutouts to form holes on opposite sides of the coupler. In other words, the extensions having the cutouts forming the holes would be similarly transversely displaced from the longitudinal axis of the coupler to allow these extensions to abut each other with an alignment of the cutouts. The holes may be circular or non-circular in any desired combination. For example, for simple push-pull motion transmission, both of the holes formed by the cutouts may be circular. For push-pull and rotary motion transmission, both of the holes would be non-circular. Finally, one of the holes may be circular and the other hole non-circular to achieve a desired motion transmission interface.

Figure 4:
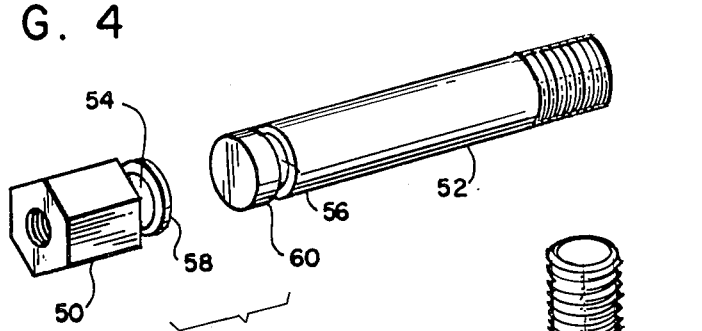
FIG. 4 is a pictorial illustration of two end shafts arranged to be coupled by the drive coupler of the present invention.
Figure 5:
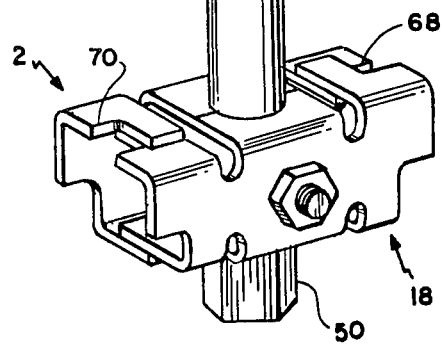
FIG. 5 is a pictorial illustration of the drive coupler of the present invention clamped on the shafts shown in FIG. 4

In FIG. 4, there are shown a pair of shafts 50, 52 arranged in a coaxial orientation and having respective peripheral grooves 54, 56 therein. The grooves 54, 56 are located adjacent to corresponding ends 58, 60 of the shafts 50, 52. The two halves 2, 18 of the coupler are effective to provide holes for capturing the peripheral grooves 54, 56 in the shafts 50, 52. Thus, each coupler half 2, 18 provides half of a pair of holes which in the assembled configuration as shown in FIG. 3, form complete holes for accepting the grooves 54, 56 in the shafts 50, 52 shown in FIG. 4. The positioning of the coupler on the shafts 50, 52 is shown in FIG. 5. The grooves 54, 56 would be configured to match the holes in the coupler. For example, circular grooves would be used with circular holes and non-circular grooves with non-circular holes for the type of motion transmission as discussed above. The holes in the coupler for accepting the grooves 54, 56 near the ends of the shafts 50, 52 may be dimensioned to permit a degree of play by the shafts 50, 52 to minimize side loading of one shaft by the other shaft and to accept minor misalignments therebetween while still capturing the grooves therein.

Figure 6:
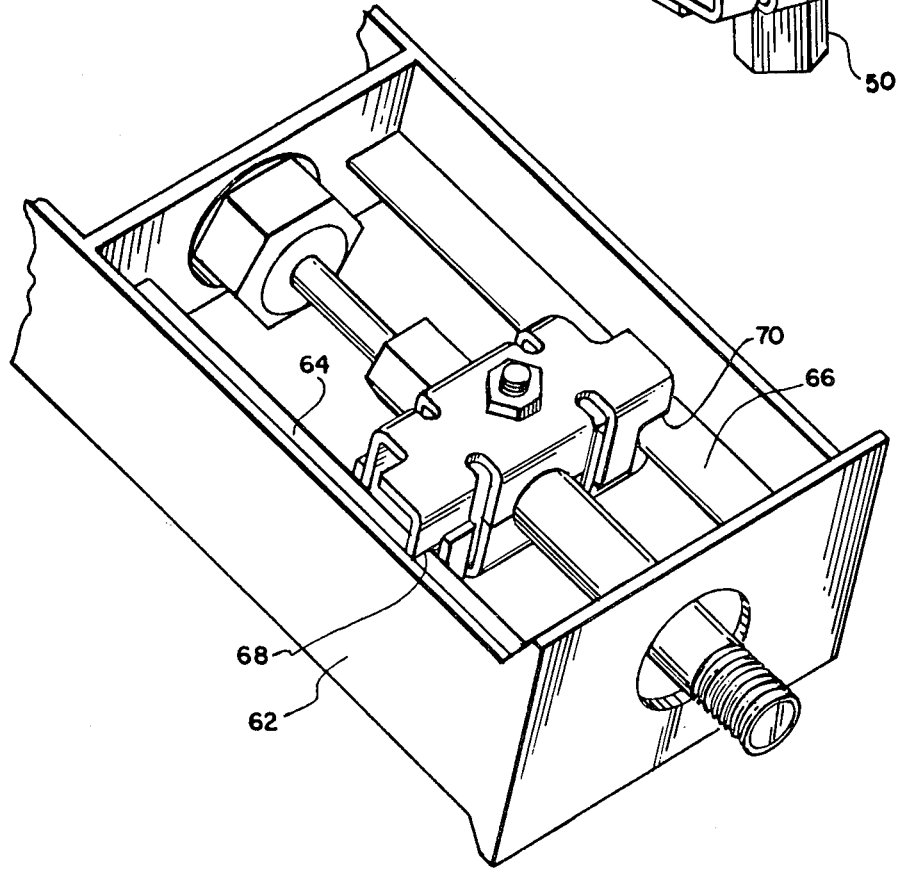
FIG. 6 is a pictorial illustration of the assembled drive coupler and shafts shown in FIG. 5 in a valve actuator apparatus using a restraining frame for preventing rotation of the coupler.

In FIG. 6, the drive coupler and the shafts 50, 52 are shown within the confines of a frame 62 which has internal ribs 64, 66 for cooperating with transverse grooves 68, 70 located in respective ends of the coupler between the assembled drive coupler halves 2, 18 to prevent rotation of the drive coupler, i.e., the grooves 68, 70 slide on respective ones of the ribs 64, 66. Thus, the drive coupler in the embodiment shown in FIG. 6 provides push-pull actuation of one shaft 50 in response to a push-pull motion of the other shaft 52. For example, one shaft could be a valve actuator screw and the other shaft, a valve stem. If the push-pull motion of the actuator screw is achieved by a rotation of the screw in a fixed nut mounted on the frame 62, the opening in the coupler capturing the end of the actuator screw would be circular and the hole in the coupler capturing the end of the valve stem would be non-circular and the peripheral end grooves in the captured shafts correlated accordingly. In another embodiment, the ribs 64, 66 in the frame 62 shown in FIG. 6 would be eliminated, and the holes formed in the drive coupler would be arranged to be of non-circular configuration to capture non-circular end grooves at the ends of the coupled shafts. Such a latter configuration would be used to transmit rotational, as well as push-pull, motion from one shaft to the other.

Accordingly, it may be seen, that there has been provided, in accordance with the present invention, an improved drive coupler.

The embodiments of the invention in which an exclusive property or privilege is claimed are defined as follows:

1. A drive coupler comprising a first coupler half having a U-shaped configuration with a cutout at the end of each leg of the "U",
   a second coupler half having a U-shaped configuration with a cutout at the end of each leg of the "U" and
   clamp means for retaining said first coupler half against said second coupler half with said ends of said legs of each "U" in an abutting relationship wherein said cutouts in said coupler halves form holes for capturing similarly configured peripheral grooves in the ends of shafts coupled by said drive coupler, wherein at least one of the holes formed by said cutouts is non-circular.

2. A drive coupler as set forth in claim 1 wherein said clamp means includes a bolt and a nut threaded on a threaded end of said bolt and each of said coupler halves includes a hole located in the bight of each "U" to allow said bolt to pass through said coupler.

3. A drive coupler as set forth in claim 1 wherein said non-circular hole is formed by at least one corresponding mating non-circular cutout in said coupler halves.

4. A drive coupler as set forth in claim 1 wherein said cutouts in said coupler halves are each non-circular.

5. A drive coupler as set forth in claim 1 wherein one of said cutouts in each of said coupler halves is semi-circular and the other one of said cutouts in each of said coupler halves is non-circular.

6. A drive coupler as set forth in claim 1 wherein each of said coupler halves includes a transverse projection and a radially depressed surface to permit a projection from an abutting coupler half to overlie said surface.

7. A drive coupler as set forth in claim 1 wherein said coupler includes a first groove at a first end of said coupler longitudinally displaced from said cutouts and a second groove at a second end of said coupler longitudinally displaced from said cutouts on the opposite end of said coupler from said first groove whereby said first and second grooves in said coupler are arranged to cooperate with external mating ribs to restrain said coupler from rotation while permitting a push-pull motion.

8. A drive coupler comprising a first coupler half having a U-shaped configuration with a cutout at the end of each leg of the "U",
   a second coupler half having a U-shaped configuration with a cutout at the end of each leg of the "U" and
   a clamp means for retaining said first coupler half against said second coupler half with said ends of said legs of each "U" in an abutting relationship wherein said cutouts in said coupler halves form holes for capturing similarly configured peripheral grooves in the ends of shafts coupled by said drive coupler, each of said coupler halves including a first groove at a first end of said coupler longitudinally displaced from said cutouts, and a second groove at a second end of said coupler longitudinally displaced from said cutouts on the opposite side of said coupler from said first groove whereby said first and second grooves in said coupler are arranged to cooperate with external mating ribs to restrain said coupler from rotation while permitting a push-pull motion.

9. A drive coupler as set forth in claim 8 wherein said clamp means includes a bolt passing through said coupler halves and a nut on said bolt.

10. A drive coupler as set forth in claim 8 wherein one of said cutouts in each of said coupler halves is semi-circular and the other one of said cutouts in each of said coupler halves is non-circular.

11. A drive coupler as set forth in claim 8 wherein said cutouts in said coupler halves are each non-circular.

* * * * *